US011505236B2

United States Patent
Shiroishi (10) Patent No.: US 11,505,236 B2
(45) Date of Patent: Nov. 22, 2022

(54) STEERING DEVICE (71) Applicant: YAMADA MANUFACTURING CO., LTD., Kiryu (JP)

(72) Inventor: Yoshinori Shiroishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/553,016

(22) Filed: Dec. 16, 2021

(65) Prior Publication Data
US 2022/0306182 A1 Sep. 29, 2022

(30) Foreign Application Priority Data

Mar. 23, 2021 (JP) ............................. JP2021-048333

(51) Int. Cl.
*B62D 1/185* (2006.01)
*B62D 1/187* (2006.01)

(52) U.S. Cl.
CPC ............. *B62D 1/185* (2013.01); *B62D 1/187* (2013.01)

(58) Field of Classification Search
CPC ................ B62D 1/185; B62D 1/187
See application file for complete search history.

(56) References Cited

U.S. PATENT DOCUMENTS

| | | | |
|---|---|---|---|
| 2008/0191455 A1* | 8/2008 | Bechtel | B62D 1/181 280/775 |
| 2017/0015345 A1* | 1/2017 | Galehr | B62D 1/181 |
| 2017/0120944 A1* | 5/2017 | Kato | B62D 1/181 |
| 2020/0070869 A1* | 3/2020 | Shiroishi | B62D 1/184 |
| 2021/0229733 A1* | 7/2021 | Kurokawa | B62D 1/184 |

FOREIGN PATENT DOCUMENTS

| | | |
|---|---|---|
| EP | 1433687 | 6/2004 |
| EP | 1500570 | 1/2005 |
| JP | 2008-284976 | 11/2008 |
| WO | 2006/042604 | 4/2006 |

* cited by examiner

*Primary Examiner* — Drew J Brown
(74) *Attorney, Agent, or Firm* — Rankin, Hill & Clark LLP (57) ABSTRACT

A steering device according to an aspect of the present disclosure includes: a column unit configured to rotatably support a steering shaft; a front bracket configured to rotatably support the column unit; a lock bolt configured to protrude in a right-left direction from the column unit; a rear bracket that includes a tilt guide hole and is attached to a vehicle body behind the front bracket, the tilt guide hole guiding the lock bolt to move upward and downward as the column unit rotates around an axis; and a connection piece bridged between the front bracket and the rear bracket in a state of being fixed to each of the front bracket and the rear bracket.

10 Claims, 8 Drawing Sheets

STEERING DEVICE

BACKGROUND OF THE INVENTION

Field of the Invention

The present disclosure relates to a steering device.

Priority is claimed on Japanese Patent Application No. 2021-048333, filed on Mar. 23, 2021, the content of which is incorporated herein by reference.

Description of Related Art

In some cases, a steering device has a tilt function. The tilt function is a function of adjusting the angle of inclination of a steering wheel (a steering shaft) in accordance with a difference in body size between drivers or a driving posture. This type of steering device includes a column that rotatably supports the steering shaft and a bracket that is attached to a vehicle body and supports the column.

For example, Japanese Unexamined Patent Application, First Publication No. 2008-284976 discloses a configuration including a front bracket and a rear bracket as brackets. The front bracket rotatably supports a column via a pivot shaft. The rear bracket supports the column behind the front bracket such that the column can move upward and downward.

According to this configuration, as the column rotates around the pivot shaft, the column moves upward and downward with respect to the rear bracket and thus the angle of inclination of the column (a steering shaft) is changed.

Meanwhile, in the above-described related art, the column is separately supported by the front bracket and the rear bracket. Therefore, it is difficult to maintain the relative positions (the angles) of the front bracket and the rear bracket in a state before a steering device is installed in a vehicle (for example, at the time of transportation or the like). In this case, at the time of transportation or the like of the steering device, the front bracket may rotate with respect to the rear bracket due to an impact or the like acting on the steering device. In a case where the front bracket rotates with respect to the rear bracket, it is necessary to check the relative angle of the front bracket with respect to the rear bracket or to correct the relative angle thereof on a production line. As a result, there is a possibility of a decrease in assembling property.

Meanwhile, for example, it is also conceivable to adopt an integrated bracket that rotatably supports a front end portion of a column and supports a rear end portion of the column such that the rear end portion can move upward and downward as in a configuration described in European Patent Application, Publication No. 1433687, European Patent Application, Publication No. 1500570 or PCT International Publication No. WO2006/042604.

However, since the bracket in the configuration as described above is provided over a wide area extending from the front end portion of the column to the rear end portion of the column, there is still a room for improvement in terms of size reduction and weight reduction. In the case of the configuration as described above, the strength of the bracket may be decreased and the feeling of driving may be deteriorated in a case where the bracket itself is thinned to reduce size and weight.

SUMMARY OF THE INVENTION

The present disclosure provides a steering device with which it is possible to achieve size reduction and weight reduction while improving the assembling property.

(1) A steering device according to an aspect of the present disclosure includes a column unit configured to support a steering shaft such that the steering shaft is rotatable around a first axis extending along a front-rear direction, a front bracket attached to a vehicle body in a state of supporting the column unit such that the column unit is rotatable around a second axis extending along a right-left direction, a protruding portion configured to protrude in the right-left direction from the column unit, a rear bracket that includes a tilt guide hole and is attached to the vehicle body behind the front bracket, the tilt guide hole guiding the protruding portion to move upward and downward as the column unit rotates around the second axis, and a connection piece bridged between the front bracket and the rear bracket in a state of being fixed to each of the front bracket and the rear bracket.

According to the aspect, the front bracket can be restricted by the connection piece from rotating with respect to the rear bracket around the second axis in a state before the steering device is installed in a vehicle. Therefore, with the steering device according to the aspect, the relative angle of the front bracket with respect to the rear bracket can be maintained at a desired position. Accordingly, with the steering device according to the aspect, it is possible to restrict the front bracket from rotating with respect to the rear bracket due to an impact or the like acting on the steering device in a case where the steering device is transported or the like from a bucket for transportation to a production line when being mounted onto a vehicle. As a result, it is possible to mount the steering device on the vehicle without spending time and effort on checking the relative angle of the front bracket with respect to the rear bracket or correcting the relative angle on the production line. Therefore, it is possible to achieve an improvement in assembling property.

According to the aspect, since the front bracket and the rear bracket are connected to each other only by the connection piece, size reduction and weight reduction can be achieved in comparison with a case where an integrated bracket is provided over a front end portion and a rear end portion of a column unit as in the related art. With the steering device according to the aspect, it is possible to maintain the feeling of driving since it is possible to sufficiently secure the strength of the brackets in comparison with a case where an integrated bracket is thinned to reduce weight or the like.

(2) The steering device according to the aspect (1) may further include an urging member connected to the protruding portion and configured to urge the column unit upward via the protruding portion. The column unit may include a rise restriction portion that abuts the connection piece from below to restrict rise of the column unit with respect to the rear bracket before the protruding portion abuts an inner peripheral edge of an upper end of the tilt guide hole when the column unit rotates around the second axis.

According to the aspect, the rise of the column unit is restricted with the rise restriction portion coming into contact with the connection piece. Accordingly, while the column unit (the steering wheel) is moving to an uppermost position, the column unit can be held at all times in a state where an outer peripheral surface of the protruding portion is caused to abut onto an inner peripheral surface of a through-hole from below by an urging force of the urging member. That is, with the steering device according to the aspect, it is possible to suppress wobbling of the column unit with respect to the protruding portion. With the steering device according to the aspect, the column unit can be restrained from being lowered by an amount corresponding to wobbling between the through-hole and the protruding portion (corresponding to a gap between the outer peripheral surface of the protruding portion and the inner peripheral surface of the through-hole) after the steering device enters the locked state at an uppermost position and the steering wheel can be fixed at a desired uppermost position.

(3) The steering device according to the aspect (1) or (2) may further include an urging member connected to the protruding portion and configured to urge the column unit upward via the protruding portion. The column unit may include a fall restriction portion that abuts the connection piece from above to restrict fall of the column unit with respect to the rear bracket before the protruding portion abuts an inner peripheral edge of a lower end of the tilt guide hole when the column unit rotates around the second axis.

According to the aspect, an urging force of the urging member is increased when the urging member is extended due to fall of the column unit. Therefore, fall of the column unit is restricted by the fall restriction portion before the urging force of the urging member becomes larger than the own weight of the column unit or the like and thus it is possible to restrain the column unit from rising due to the urging force of the urging member after the steering device enters the locked state at a lowermost position. Accordingly, with the steering device according to the aspect, the steering wheel can be fixed at a desired lowermost position.

(4) In the steering device according to the aspect (2) or (3), an elastic member may be provided at a position on the connection piece that faces any of the rise restriction portion and the fall restriction portion in a direction of rotation of the column unit around the second axis.

According to the aspect, the rise restriction portion and the fall restriction portion come into contact with the connection piece via the elastic member and thus a noise or impact attributable to contact between the column unit and the connection piece at the uppermost position and the lowermost position can be reduced.

(5) The steering device according to any of the aspects (1) to (4) may further include: a protrusion portion formed in one of the connection piece and the front bracket; a recess portion into which the protrusion portion is fitted, the recess portion being formed in the other of the connection piece and the front bracket; and a fastening member inserted into a fixation hole penetrating the connection piece and configured to fasten the connection piece and the front bracket to each other.

According to the aspect, the connection piece is fixed to the front bracket at two points and thus the connection piece can be restricted from rotating with respect to the front bracket. Accordingly, with the steering device according to the aspect, it is easy to maintain the relative angle of the front bracket with respect to the rear bracket at a desired position. With the steering device according to the aspect, it is easy to fasten the connection piece and the front bracket to each other through the fixation hole when fitting the protrusion portion into the recess portion in advance. As a result, it is possible to suppress a decrease in manufacturing efficiency caused by addition of the connection piece.

According to the aspects of the present disclosure, it is possible to achieve a size reduction and a weight reduction while improving the assembling property.

DETAILED DESCRIPTION OF THE INVENTION

Next, an embodiment of the present disclosure will be described with reference to the drawings.

[Steering Device]

Figure 1:
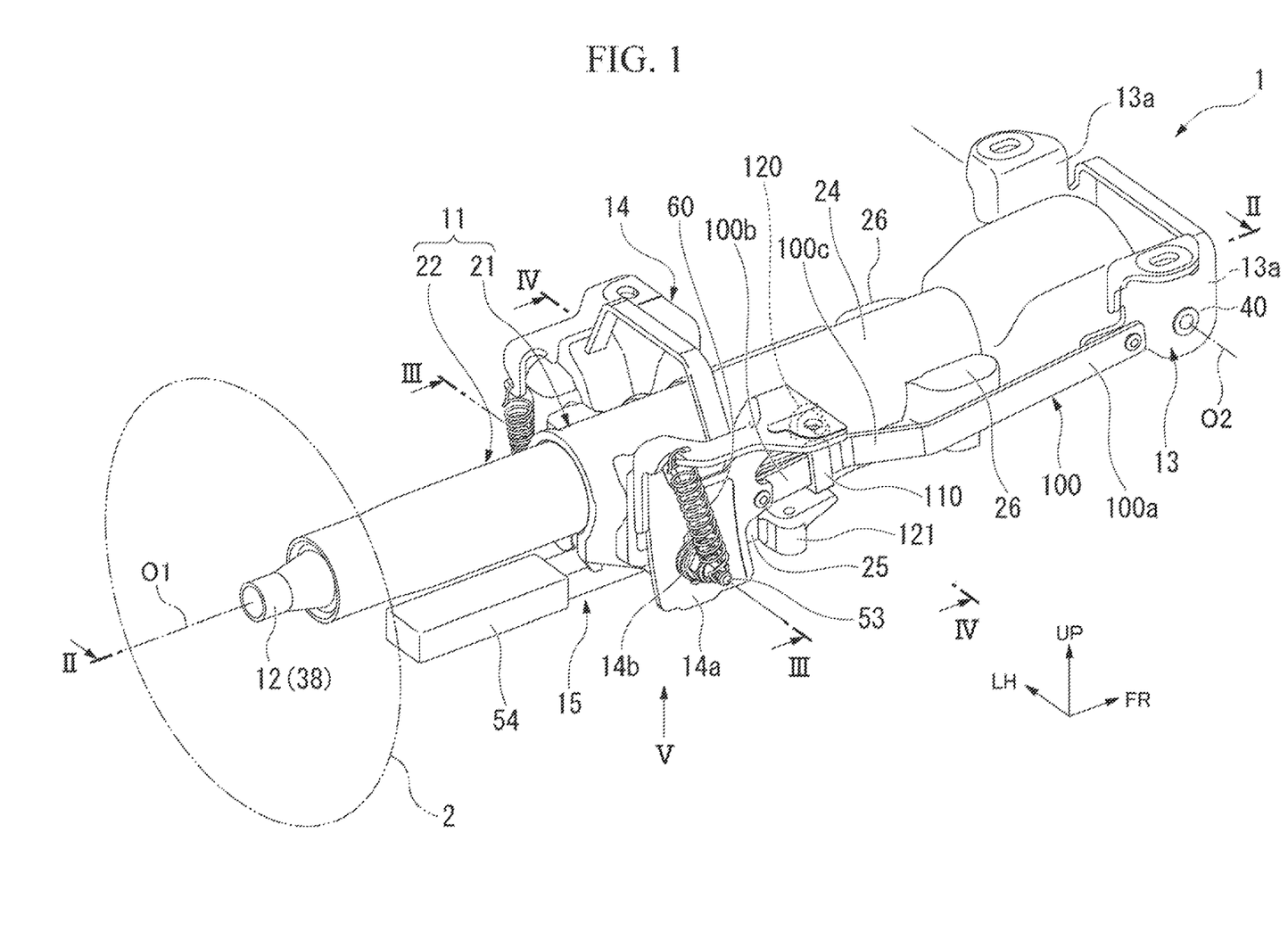
FIG. 1 is a perspective view of a steering device according to an embodiment.

FIG. 1 is a perspective view of a steering device 1.

As shown in FIG. 1, the steering device 1 is installed in a vehicle. The steering device 1 adjusts the steering angles of wheels as a steering wheel 2 is rotated.

The steering device 1 includes a column unit 11, a steering shaft 12, brackets (a front bracket 13 and rear bracket 14), and a lock mechanism 15. Each of the column unit 11 and the steering shaft 12 is formed along an axis (a first axis) O1. Therefore, in the following description, a direction in which the axis O1 of the column unit 11 and the steering shaft 12 extends may be simply referred to as a shaft axial direction, a direction orthogonal to the axis O1 may be referred to as a shaft radial direction, and a direction around the axis O1 may be referred to as a shaft circumferential direction.

The steering device 1 of the present embodiment is installed in the vehicle in a state where the axis O1 intersects a front-rear direction. Specifically, the axis O1 of the steering device 1 extends to be closer to an upper side toward a rear side. In the following description, for the sake of convenience, in the steering device 1, a direction toward the steering wheel 2 in the shaft axial direction will be simply referred to as a rearward direction, and a direction toward a side opposite to the steering wheel 2 will be simply referred to as a frontward direction (an arrow FR). Of the shaft radial directions, a vertical direction in a state where the steering device 1 is attached to the vehicle will be simply referred to as a vertical direction (an arrow UP represents an upward direction) and a right-left direction will be simply referred to as a right-left direction.

<Column Unit 11>

The column unit 11 includes an outer column 21, an inner column 22 and a hanger bracket 23.

The outer column 21 is attached to a vehicle body via the brackets 13 and 14. The outer column 21 includes a holding tubular portion 24, fastening portions 25, and projecting portions 26.

Figure 2:
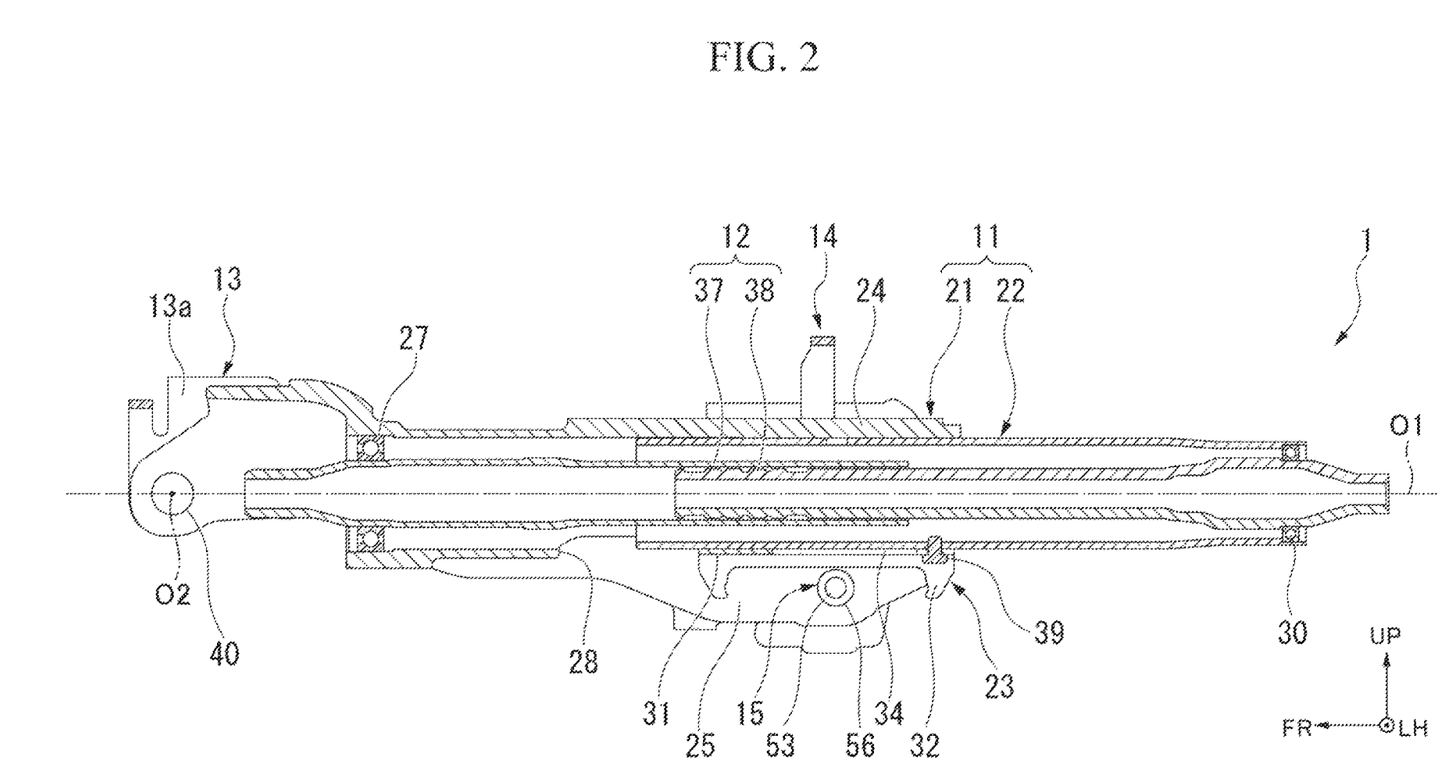
FIG. 2 is a cross-sectional view taken along line II-II of FIG. 1.

FIG. 2 is a cross-sectional view taken along line II-II of FIG. 1.

As shown in FIG. 2, the holding tubular portion 24 is formed in a tubular shape extending in the front-rear direction. A front bearing 27 is fitted (press-fitted) into a front end portion of the inside of the holding tubular portion 24. A slit 28 is formed at a portion in the shaft circumferential direction (in the present embodiment, a lower portion of the outer column 21) of a rear portion of the holding tubular portion 24. The slit 28 penetrates the outer column 21 in the shaft radial direction and is open at a rear end surface of the outer column 21.

The projecting portions 26 project toward both sides in the right-left direction at a front end portion of the holding tubular portion 24.

Figure 3:
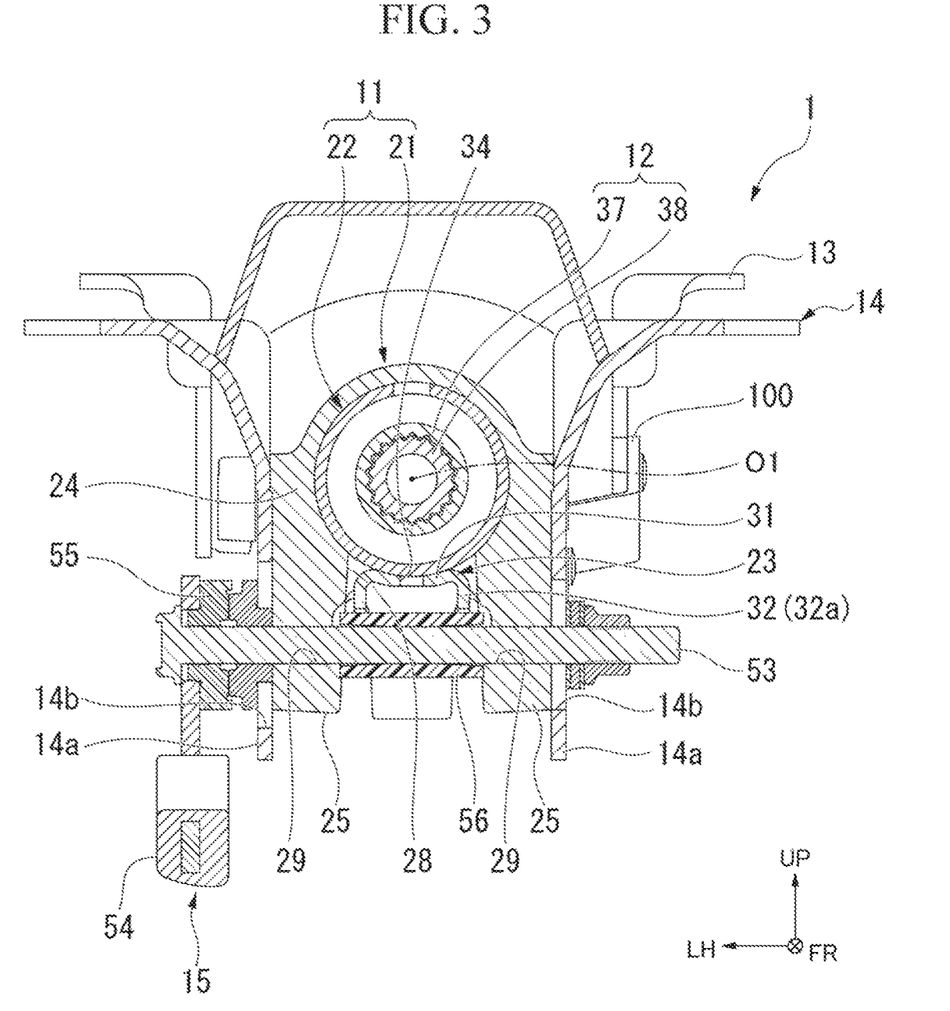
FIG. 3 is a cross-sectional view taken along line III-III of FIG. 1.

FIG. 3 is a cross-sectional view taken along line of FIG. 1.

As shown in FIG. 3, the fastening portions 25 of the holding tubular portion 24 extend downward from positions facing each other in the right-left direction with the slit 28 interposed therebetween. Through-holes 29 that penetrate the fastening portions 25 in the right-left direction are formed in the fastening portions 25.

As shown in FIG. 2, the inner column 22 is formed in a tubular shape extending along the front-rear direction. The outer diameter of the inner column 22 is smaller than the inner diameter of the holding tubular portion 24. The inner column 22 is inserted into the holding tubular portion 24 from behind. The inner column 22 is configured to be movable in the front-rear direction with respect to the outer column 21. A rear bearing 30 is fitted (press-fitted) into a rear end portion of the inside of the inner column 22.

Figure 4:
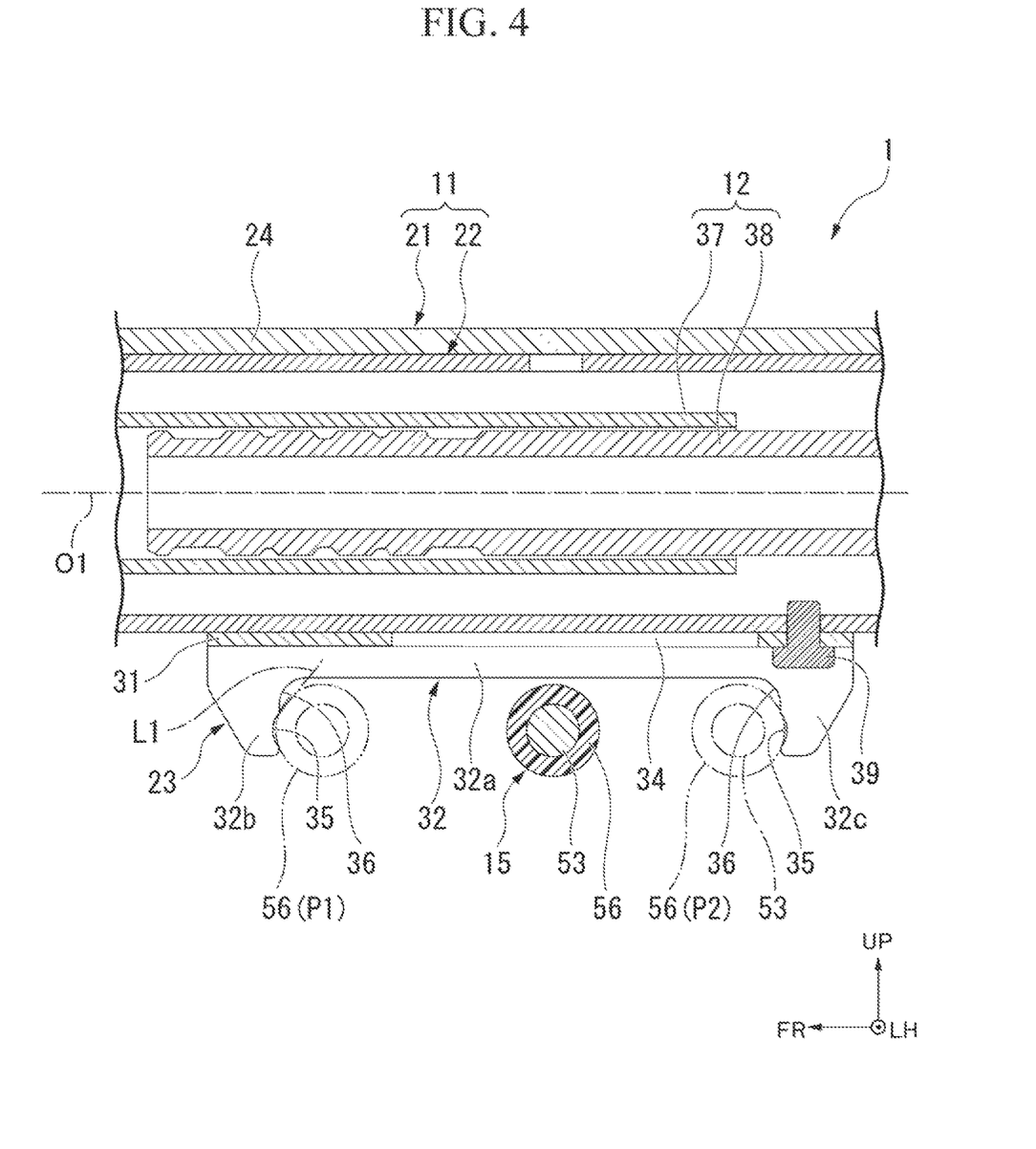
FIG. 4 is an enlarged view of a main portion of FIG. 2.

FIG. 4 is an enlarged view of a main portion of FIG. 2.

As shown in FIGS. 3 and 4, the hanger bracket 23 is downwardly fixed to a lower portion of the inner column 22. The hanger bracket 23 is formed by, for example, performing presswork on a metal plate. The hanger bracket 23 is exposed to the outside of the holding tubular portion 24 through the slit 28 of the holding tubular portion 24. The hanger bracket 23 is formed in a U-like shape that is open to a lower side in a front view as seen in the front-rear direction.

The hanger bracket 23 includes an attachment plate portion 31 and guide walls 32 that extend downward from both end portions of the attachment plate portion 31 in the right-left direction.

The attachment plate portion 31, of which a thickness direction is the vertical direction, extends in the front-rear direction along an outer peripheral surface of the inner column 22. An energy absorbing (EA) elongated hole 34 that penetrates the attachment plate portion 31 in the vertical direction is formed in the attachment plate portion 31. The EA elongated hole 34 is formed in a slit-like shape extending in the front-rear direction. Positions where the guide walls 32 are provided are not limited to both end portions of the attachment plate portion 31 in the right-left direction as long as at least one of the guide walls 32 is provided at a position on the attachment plate portion 31 that is separated from the EA elongated hole 34.

The hanger bracket 23 is fixed to the inner column 22 by a bolt (a fixation member) 39. The bolt 39 is fastened to the inner column 22 in a state of being inserted with respect to a rear end portion of the EA elongated hole 34 from below. Accordingly, the hanger bracket 23 is restricted from moving in the front-rear direction with respect to the inner column 22 during a telescopic operation (is moved integrally with the inner column 22). In the present embodiment, a configuration in which the bolt 39 is directly fastened to the inner column 22 as the fixation member has been described. However, the present disclosure is not limited thereto. For example, the bolt 39 may be fastened to the inner column 22 by being screwed into a nut provided inside the inner column 22. As the fixation member, a rivet or the like may be used instead of the bolt 39.

The guide walls 32 are formed over the entire length of the attachment plate portion 31. Each guide wall 32 includes a telescopic guide portion 32a and telescopic stoppers 32b and 32c.

The telescopic guide portion 32a is formed at a portion of the guide wall 32 excluding both front and rear end portions. A lower end edge of the telescopic guide portion 32a is formed in a linear shape along the front-rear direction.

The telescopic stoppers 32b and 32c are a front telescopic stopper 32b positioned at a front end portion of the guide wall 32 and a rear telescopic stopper 32c positioned at a rear end portion of the guide wall 32. The front telescopic stopper 32b restricts the inner column 22 from moving forward with respect to the outer column 21 during the telescopic operation. The rear telescopic stopper 32c restricts the inner column 22 from moving rearward with respect to the outer column 21 during the telescopic operation. The telescopic stoppers 32b and 32c are formed to be symmetrical in the front-rear direction. Therefore, the following description will be made by using the front telescopic stopper 32b as an example. However, each of the telescopic stoppers 32b and 32c may have an asymmetrical shape.

The front telescopic stopper 32b protrudes downward with respect to the telescopic guide portion 32a. The front telescopic stopper 32b is formed in a trapezoidal shape of which the width in the front-rear direction gradually decreases toward a lower side. A holding portion 35 and a flank portion 36 are formed at a rear end edge of the front telescopic stopper 32b.

The holding portion 35 is positioned at a lower end portion of the front telescopic stopper 32b. The holding portion 35 is formed in an arc shape that is curved forward in a side view as seen in the right-left direction. The central angle of the holding portion 35 is set to be smaller than 180°.

The flank portion 36 is connected to the holding portion 35 at an upper end portion of the front telescopic stopper 32b. The flank portion 36 is formed in an arc shape that is curved forward in the side view. The flank portion 36 is recessed forward in the side view with respect to an extension line L1 extending along a tangent line to an upper end of the holding portion 35. The shape of the flank portion 36 is not limited to an arc shape as long as the flank portion 36 is configured to be positioned ahead of the extension line L1.

<Steering Shaft 12>

As shown in FIG. 2, the steering shaft 12 includes an outer shaft 37 and an inner shaft 38.

The outer shaft 37 is formed in a hollow tubular shape extending in the front-rear direction. The outer shaft 37 is inserted into the column unit 11. A front end portion of the outer shaft 37 is press-fitted into the front bearing 27 in the outer column 21. Accordingly, the outer shaft 37 is supported by the outer column 21 so as to be rotatable around the axis O1. The front end portion of the outer shaft 37 (a portion that protrudes forward beyond the front bearing 27) is connected to, for example, a steering gear box (not shown) or the like via a universal joint (not shown) or the like.

The inner shaft 38 extends in the front-rear direction. The inner shaft 38 is inserted into the inner column 22. The rear end portion of the inner shaft 38 is press-fitted into the rear bearing 30 in the inner column 22. Accordingly, the inner shaft 38 is supported by the inner column 22 so as to be rotatable around the axis O1. The steering wheel 2 (refer to FIG. 1) is connected to a portion of the inner shaft 38 that protrudes rearward beyond the inner column 22.

A front end portion of the inner shaft 38 is inserted into the outer shaft 37 in the inner column 22. The inner shaft 38 is configured to be movable in the front-rear direction with respect to the outer shaft 37 together with the inner column 22 as the inner column 22 moves in the front-rear direction with respect to the outer column 21.

In the present embodiment, a female spline is formed on an inner peripheral surface of the outer shaft 37. The female spline engages with a male spline formed on an outer peripheral surface of the inner shaft 38. As a result, the inner shaft 38 moves in the front-rear direction with respect to the outer shaft 37 in a state of being restricted from rotating relative to the outer shaft 37. A telescopic structure of the steering shaft 12 and a rotation restriction structure can be modified as appropriate. In the present embodiment, a configuration in which the outer shaft 37 is disposed ahead of the inner shaft 38 has been described. However, the present disclosure is not limited thereto and a configuration in which the outer shaft 37 is disposed behind the inner shaft 38 may also be adopted.

<Brackets 13 and 14>

As shown in FIG. 1, the front bracket 13 connects the outer column 21 and the vehicle body to each other via a pivot shaft 40. The front bracket 13 is formed in a U-like shape that is open to a lower side in a front view. The front bracket 13 surrounds the rear end portion of the outer column 21 on an upper side and both sides in the right-left direction. Front side walls 13a of the front bracket 13, which are positioned on the both sides in the right-left direction, are connected to the outer column 21 via the pivot shaft 40. Accordingly, the outer column 21 is supported by the front bracket 13 so as to be rotatable around an axis O2 of the pivot shaft 40 that extends in the right-left direction.

The rear bracket 14 connects the outer column 21 and the vehicle body to each other via the lock mechanism 15. The rear bracket 14 is formed in a U-like shape that is open to the lower side in the front view. The rear bracket 14 surrounds an upper side and both sides in the right-left direction of the outer column 21.

The rear bracket 14 includes rear side walls 14a disposed on both of the right and left sides with respect to the column unit 11. As shown in FIG. 3, a tilt guide hole 14b that penetrates each rear side wall 14a in the right-left direction is formed in each rear side wall 14a. The tilt guide hole 14b is an elongated hole that extends to be closer to the rear side toward the upper side. Specifically, each tilt guide hole 14b is formed in an arc shape that is curved rearward.

The front bracket 13 and the rear bracket 14 are connected to each other by a connection piece 100. A thickness direction of the connection piece 100 is the right-left direction and the connection piece 100 extends in the front-rear direction. The connection piece 100 is bridged between the front side wall 13a on a right side of the front bracket 13 and the rear side wall 14a on a right side of the rear bracket 14. The connection piece 100 is fixed to the side walls 13a and 14a to restrict the front bracket 13 from moving (rotating) with respect to the rear bracket 14. Details of the connection piece 100 will be described later.

<Lock Mechanism 15>

As shown in FIG. 3, the lock mechanism 15 includes a lock bolt (a protruding portion) 53, an operation lever 54, and a fastening cam 55.

The lock bolt 53 penetrates the rear side walls 14a and the fastening portions 25 in the right-left direction through the tilt guide holes 14b and the through-holes 29. At the time of a telescopic operation, the inner column 22 or the like moves forward and backward such that the lock bolt 53 moves forward and backward along the telescopic guide portions 32a. At the time of a tilting operation, the lock bolt 53 moves upward and downward together with the column unit 11 by moving upward and downward in the tilt guide holes 14b.

A collar 56 is mounted onto a central portion of the lock bolt 53 (a portion positioned between the fastening portions 25). The collar 56 is formed in a tubular shape that is coaxial with the lock bolt 53. The collar 56 is formed of a material that is softer than the lock bolt 53 (for example, an elastically deformable material such as rubber or a resin material). As shown in FIG. 4, at the time of a telescopic operation, the collar 56 abuts the holding portions 35 of the front telescopic stoppers 32b from behind when the inner column 22 is at the foremost position (when the column unit 11 is at a maximum contraction position P1). Meanwhile, at the time of a telescopic operation, the collar 56 abuts the holding portions 35 of the rear telescopic stoppers 32c from ahead when the inner column 22 is at the rearmost position (when the column unit 11 is at a maximum expansion position P2). That is, the lock bolt 53 abuts the telescopic stoppers 32b and 32c via the collar 56. The lock mechanism 15 may be configured such that the lock bolt 53 directly abuts the telescopic stoppers 32b and 32c.

As shown in FIG. 1, urging members 60 are interposed between the lock bolt 53 and the rear bracket 14. The urging members 60 are, for example, coil springs. The urging members 60 are interposed between a left side end portion of the lock bolt 53 and the rear side wall 14a on the left side and between a right end portion of the lock bolt 53 and the rear side wall 14a on the right side. The urging members 60 urge the column unit 11, the steering shaft 12, and the like upward via the lock bolt 53. Accordingly, the column unit 11 is restrained from being lowered due to the own weight of the column unit 11 at the time of an unlocking operation.

The operation lever 54 is connected to the left side end portion of the lock bolt 53. The operation lever 54 is configured to be rotatable together with the lock bolt 53 around an axis extending along the right-left direction.

As shown in FIG. 3, the fastening cam 55 is interposed between the operation lever 54 and the rear bracket 14 (the rear side walls 14a). The fastening cam 55 is configured such that the thickness thereof in the right-left direction is changed as the operation lever 54 is rotated. The steering device 1 is configured such that the fastening portions 25 approach each other or are separated from each other via the rear side walls 14a in the right-left direction (the width of the slit 28 (an interval) in the right-left direction is increased or decreased) when the thickness of the fastening cam 55 is changed. Specifically, when the operation lever 54 is rotated such that the thickness of the fastening cam 55 is increased, the fastening portions 25 approach each other together with the rear side walls 14a and thus the inner diameter of the holding tubular portion 24 is decreased. Accordingly, the inner column 22 is clamped by the holding tubular portion 24 and the inner column 22 is restricted from moving with respect to the outer column 21 in the front-rear direction (a locked state). Meanwhile, when the operation lever 54 is rotated in the locked state such that the thickness of the fastening cam 55 is decreased, the fastening portions 25 are separated from each other together with the rear side walls 14a and thus the inner diameter of the holding tubular portion 24 is increased. Accordingly, the inner column 22 clamped by the holding tubular portion 24 is released and the inner column 22 is allowed to move with respect to the outer column 21 in the shaft axial direction (an unlocked state).

Figure 5:
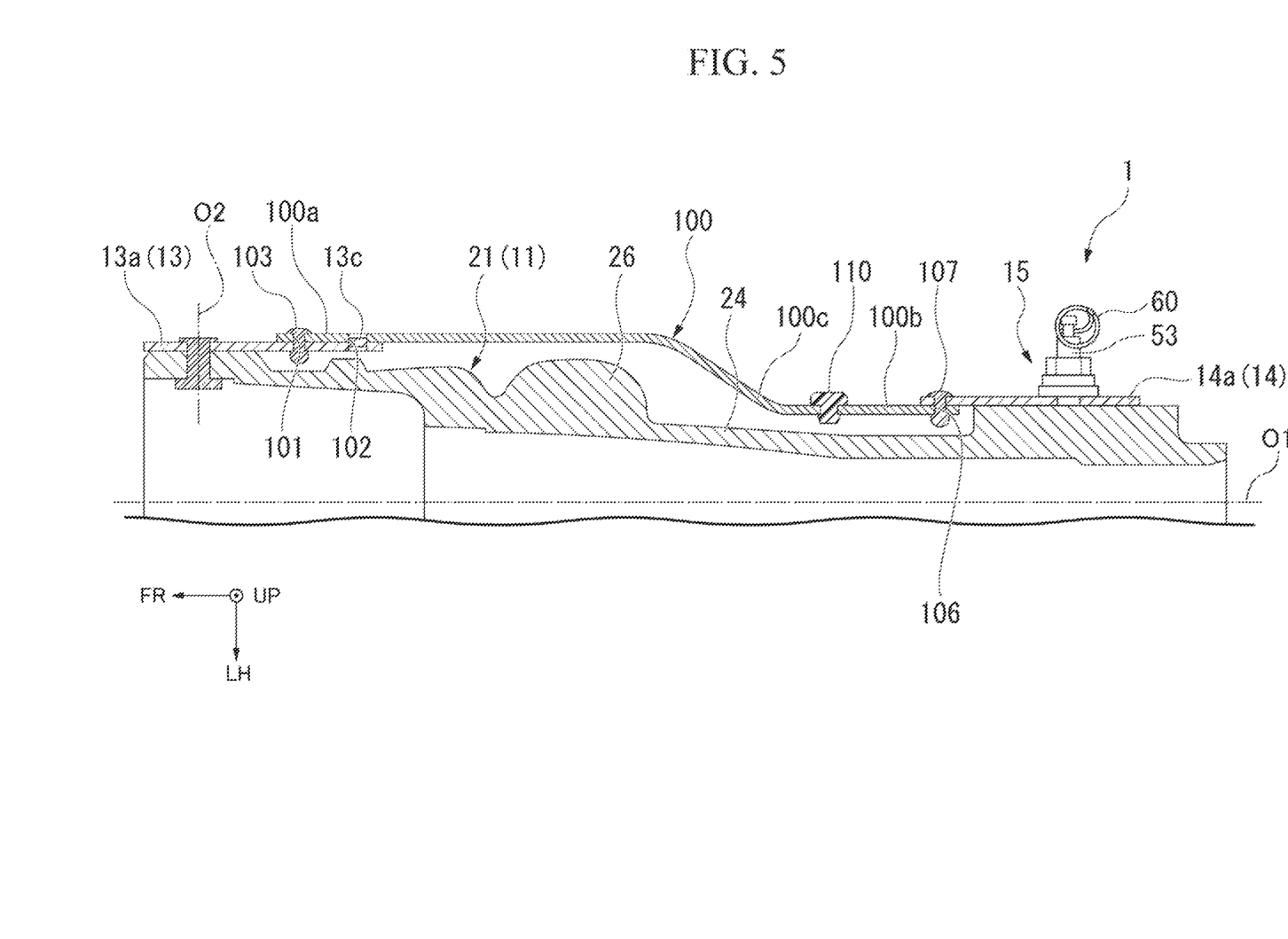
FIG. 5 is a cross-sectional view along a direction in which a connection piece extends.

Next, the above-described connection piece 100 and a structure in the vicinity of the connection piece 100 will be described. FIG. 5 is a cross-sectional view along a direction in which the connection piece 100 extends.

As shown in FIGS. 1 and 5, the connection piece 100 is formed in a crank-like shape that extends in the front-rear direction while being curved in the right-left direction.

Specifically, the connection piece 100 includes a front extension portion 100a, a rear extension portion 100b, and a connection portion 100c.

The front extension portion 100a constitutes a front portion of the connection piece 100. The front extension portion 100a extends in the front-rear direction on the right side of the column unit 11. A front end portion of the front extension portion 100a overlaps with the front side wall 13a on the right side from outside in the right-left direction. The front end portion of the front extension portion 100a extends through an outer side in the right-left direction with respect to the projecting portion 26, in the front-rear direction.

As shown in FIG. 5, a fixation hole 101 and a positioning hole (a recess portion) 102 are formed at the front end portion of the front extension portion 100a. Each of the fixation hole 101 and the positioning hole 102 penetrates the front extension portion 100a in the right-left direction. A rivet (a fastening member) 103 is inserted into the fixation hole 101. The rivet 103 fastens the front extension portion 100a and the front side wall 13a to each other.

The positioning hole 102 is formed in front of the fixation hole 101 of the front extension portion 100a. A protrusion portion 13c that protrudes from the front side wall 13a is fitted into the positioning hole 102. In this manner, the front extension portion 100a is connected to the front side wall 13a at least two points via the fixation hole 101 and the positioning hole 102. Accordingly, the connection piece 100 is restricted from rotating with respect to the front bracket 13 with any of the fixation hole 101 and the positioning hole 102 serving as a fulcrum.

The fixation hole 101 and the positioning hole 102 can be set at any position. The connection piece 100 may be fixed to the front side wall 13a via a rivet for each of the fixation hole 101 and the positioning hole 102. A method of fixing the connection piece 100 and the front bracket 13 to each other is not limited to using the rivet 103 or the protrusion portion 13c and a bolt, a pin, or the like or welding or the like may also be used. The connection piece 100 may be fixed at one point as long as the connection piece 100 is restricted from rotating relative to the front bracket 13. The front extension portion 100a may be fixed inside the front side wall 13a. In the present embodiment, a case where the front extension portion 100a is provided with the positioning hole 102 in the form of a recess portion has been described. However, the front extension portion 100a may be provided with a protrusion portion with the front bracket 13 being provided with a recess portion.

The rear extension portion 100b constitutes a rear portion of the connection piece 100. The rear extension portion 100b extends in the front-rear direction on the right side of the column unit 11, behind the projecting portion 26. A rear end portion of the rear extension portion 100b overlaps with the rear side wall 14a on the right side from inside in the right-left direction.

A through-hole 106 is formed in the rear extension portion 100b. A fastening member such as a rivet 107 is inserted into the through-hole 106. The rivet 107 is fastened to the rear side wall 14a. The rear extension portion 100b may be fixed to the rear side wall 14a at a plurality of positions. The rear extension portion 100b may overlap with the rear side wall 14a from outside in the right-left direction.

The connection portion 100c connects a rear end of the front extension portion 100a and a front end of the rear extension portion 100b to each other. The connection portion 100c extends with an inclination to be closer to the left side (an inner side in the right-left direction) from the front extension portion 100a toward the rear side.

Figure 6:
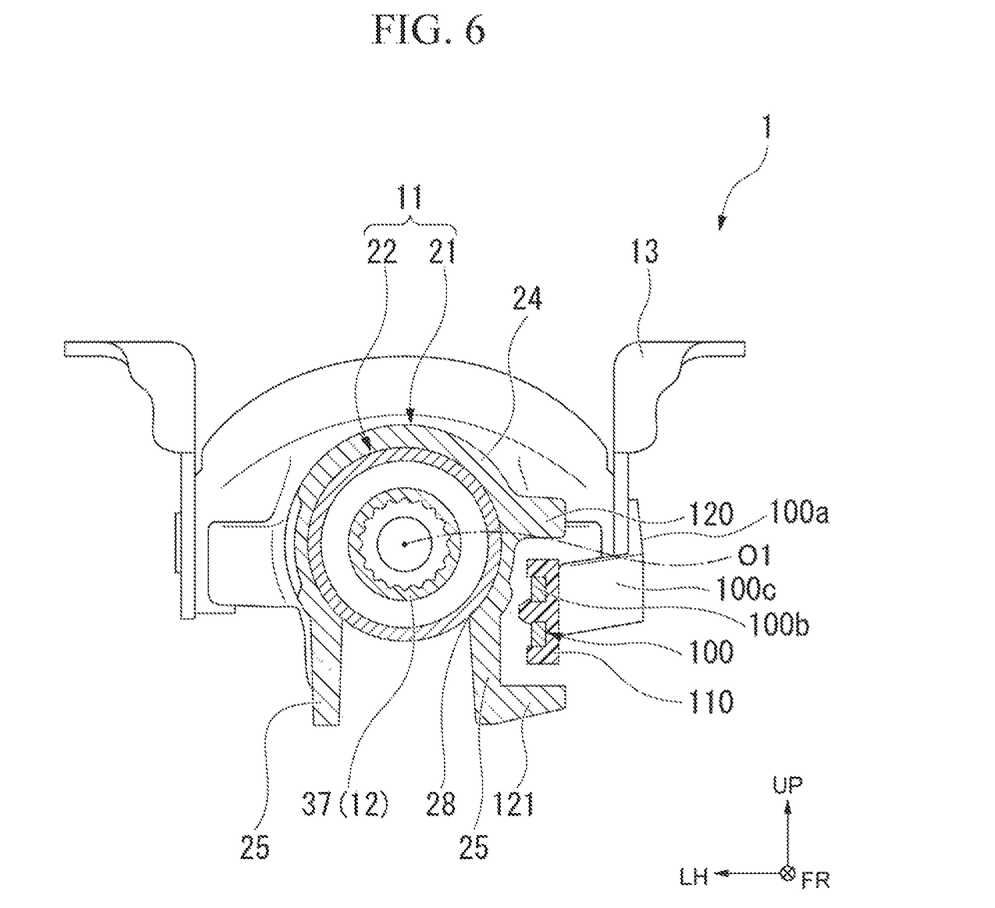
FIG. 6 is a cross-sectional view corresponding to line VI-VI of FIG. 1.

FIG. 6 is a cross-sectional view corresponding to line VI-VI of FIG. 1.

As shown in FIGS. 5 and 6, a rubber (an elastic member) 110 is mounted onto the rear extension portion 100b. The rubber 110 is integrally formed of a material that is softer than the connection piece 100 (for example, an elastically deformable material such as rubber or a resin material). The rubber 110 is formed in a C-like shape that is open to the inner side in the right-left direction in a front view. The rubber 110 surrounds rear extension portion 100b on both sides in the vertical direction and the outer side in the right-left direction. The rubber 110 may be configured to cover only an upper end surface and a lower end surface of the rear extension portion 100b separately from each other.

As shown in FIGS. 1 and 6, a fall restriction portion 120 and a rise restriction portion 121 are formed on the outer column 21 at positions overlapping with the rubber 110 in a plan view.

The fall restriction portion 120 protrudes toward the outer side in the right-left direction (the right side) from a portion of the outer column 21 that is positioned above the rubber 110. The fall restriction portion 120 is a stopper that restricts the column unit 11 from moving downward by abutting onto the rubber 110 from above at the lowermost position of a tilting operation. That is, the rubber 110 is positioned on the locus of rotation of the fall restriction portion 120 when the column unit 11 rotates around the axis O2 during the tilting operation. The dimensions of the fall restriction portion 120 are set such that the fall restriction portion 120 abuts the rubber 110 before the lock bolt 53 comes into contact with inner peripheral edges of lower ends of the tilt guide holes 14b at the time of the tilting operation. It is preferable that a lower end surface of the fall restriction portion 120 extends to be parallel to an upper end surface of the rubber 110.

The rise restriction portion 121 protrudes toward the outer side in the right-left direction (the right side) from a portion of the outer column 21 that is positioned below the rubber 110. The rise restriction portion 121 is a stopper that restricts the column unit 11 from moving upward by abutting onto the rubber 110 from below at the uppermost position of the tilting operation. That is, the rubber 110 is positioned on the locus of rotation of the rise restriction portion 121 when the column unit 11 rotates around the axis O2 during the tilting operation. The dimensions of the rise restriction portion 121 are set such that the rise restriction portion 121 abuts the rubber 110 before the lock bolt 53 comes into contact with inner peripheral edges of upper ends of the tilt guide holes 14b at the time of the tilting operation. It is preferable that an upper end surface of the rise restriction portion 121 extends to be parallel to a lower end surface of the rubber 110.

As described above, the connection piece 100, the rubber 110, the fall restriction portion 120, and the rise restriction portion 121 constitute a tilting stopper mechanism in which the connection piece 100 abuts the fall restriction portion 120 or the rise restriction portion 121 via the rubber 110 to limit the angle of rotation of the column unit 11 as the column unit 11 rotates. In an example shown in the drawings, the amounts of protrusion from the outer column 21 in the right-left direction of the fall restriction portion 120 and the rise restriction portion 121 are equal to each other. Meanwhile, a dimension of the fall restriction portion 120 in the front-rear direction is larger than that of the rise restriction portion 121. In the present embodiment, a configuration in which one rubber 110 can abut onto both of the fall restriction portion 120 and the rise restriction portion 121 has been described. However, the present disclosure is not limited thereto. For example, different rubbers 110 may be separately provided to correspond to the fall restriction portion 120 and the rise restriction portion 121. A configuration in which the connection piece 100 directly abuts the fall restriction portion 120 and the rise restriction portion 121 may also be adopted.

[Operation]

Next, the operation of the steering device 1 described above will be described. The following description will be made focusing on a telescopic operation, a tilting operation, and an operation at the time of secondary collision.

<Telescopic Operation>

As shown in FIG. 1, in a case where a telescopic operation is to be performed, the operation lever 54 is rotated first such that the steering device 1 enters the unlocked state. Specifically, as shown in FIG. 3, the operation lever 54 is rotated in a direction (for example, a downward direction) such that the thickness of the fastening cam 55 is decreased. As a result, the fastening portions 25 are separated from each other together with the rear side walls 14a and thus the inner diameter of the holding tubular portion 24 is increased. Accordingly, the inner column 22 clamped by the holding tubular portion 24 is released.

When the steering wheel 2 is pressed forward in the unlocked state, the steering wheel 2 is moved forward with respect to the outer column 21 together with the inner column 22 and the steering shaft 12. When the steering wheel 2 is pulled rearward in the unlocked state, the steering wheel 2 is moved rearward with respect to the outer column 21 together with the inner column 22 and the steering shaft 12. Accordingly, it is possible to adjust the position of the steering wheel 2 in the front-rear direction to any position.

At the time of the telescopic operation, the hanger bracket 23 is integrally moved forward and rearward as the inner column 22 or the like is moved forward or rearward. As shown in FIG. 4, the lock bolt 53 abuts the front telescopic stoppers 32b from behind via the collar 56 with the column unit 11 being at the maximum contraction position P1 and thus the inner column 22 and the like are restricted from moving forward. Meanwhile, the lock bolt 53 abuts the rear telescopic stoppers 32c from ahead via the collar 56 with the column unit 11 being at the maximum expansion position P2 and thus the inner column 22 and the like are restricted from moving rearward.

Next, as shown in FIG. 3, after the position of the steering wheel 2 is adjusted to a desired position, the operation lever 54 is rotated such that the steering device 1 enters the locked state. Specifically, the operation lever 54 is rotated in a direction (for example, an upward direction) such that the thickness of the fastening cam 55 is increased. As a result, the fastening portions 25 approach each other together with the rear side walls 14a and thus the holding tubular portion 24 (the slit 28) is contracted. Accordingly, the inner column 22 is clamped by the holding tubular portion 24 and the outer column 21 is clamped by the rear side walls 14a. As a result, the telescopic operation is restricted.

<Tilting Operation>

Figure 7:
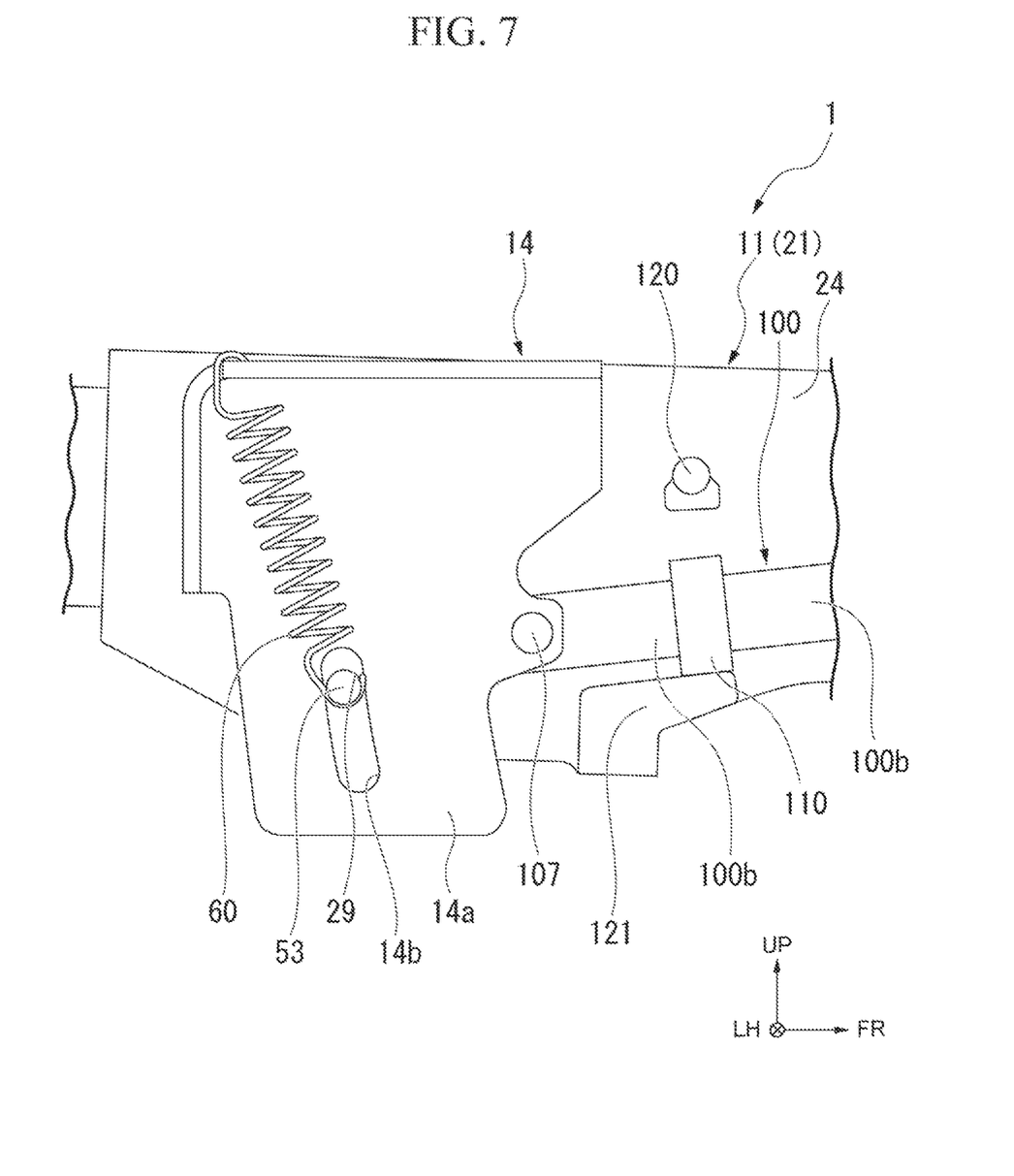
FIG. 7 is a side view of the steering device and is a description view for description of a tilting operation.

In a case where the steering wheel 2 is to be adjusted to face upward at the time of the tilting operation, the steering wheel 2 is pressed upward in the unlocked state. Then, the lock bolt 53 moves upward in the tilt guide holes 14b and thus the steering wheel 2 moves upward in a direction around the axis O2 together with the column unit 11 and the steering shaft 12. As shown in FIG. 7, while the column unit 11 is being moved upward, the lock bolt 53 moves upward in the tilt guide holes 14b. At this time, the rise restriction portion 121 of the outer column 21 abuts the connection piece 100 from below via the rubber 110 before the lock bolt 53 abuts against the inner peripheral edges of the upper ends of the tilt guide holes 14b. Accordingly, the column unit 11 is restricted from moving upward.

Figure 8:
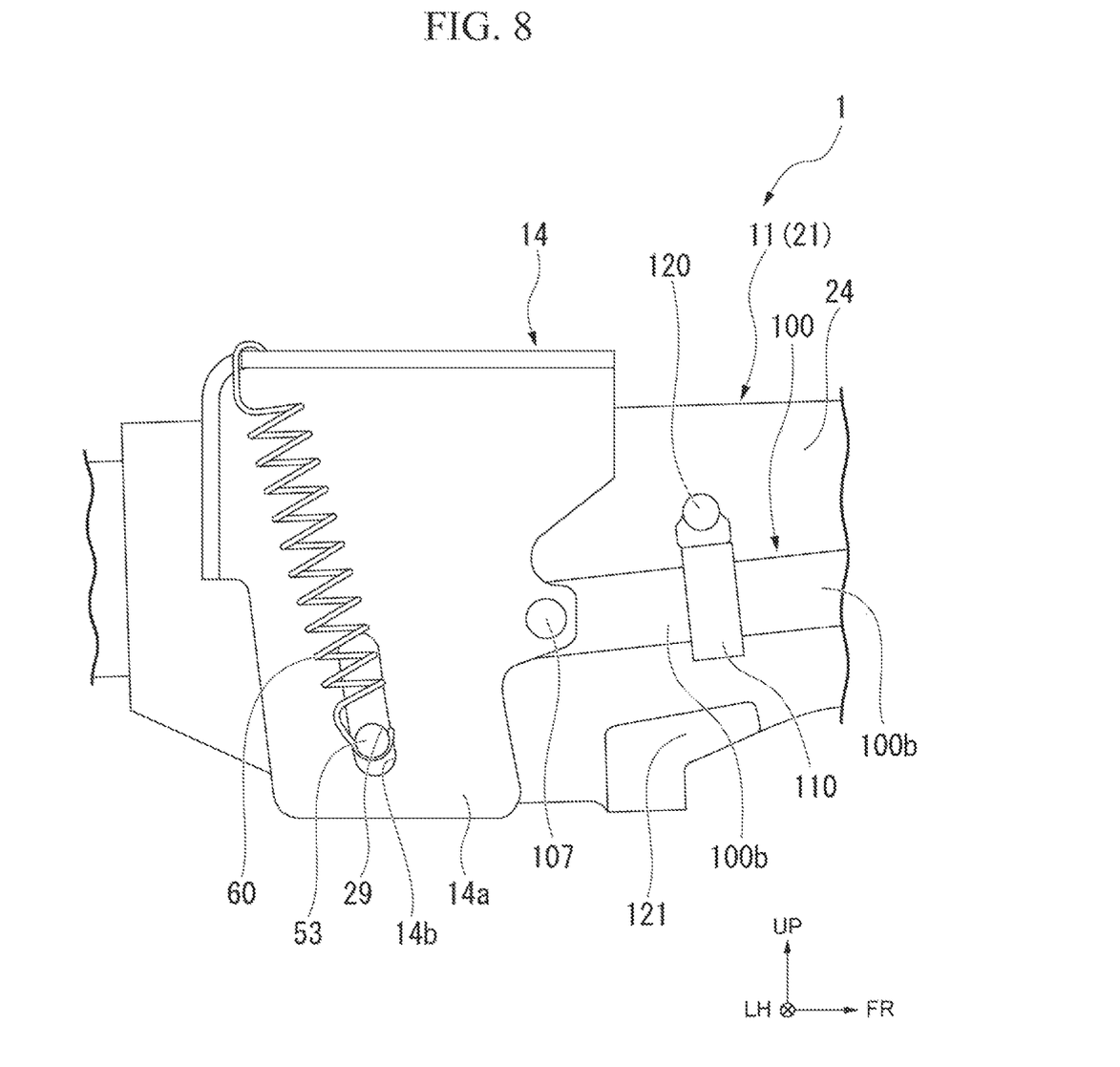
FIG. 8 is a side view of the steering device and is a description view for description of a tilting operation.

Meanwhile, in a case where the steering wheel 2 is to be adjusted to face downward, the steering wheel 2 is pulled downward in the unlocked state. Then, the steering wheel 2 moves downward along the tilt guide holes 14b in a direction around the axis O2 together with the column unit 11 and the steering shaft 12. As shown in FIG. 8, while the column unit 11 is being moved downward, the lock bolt 53 moves downward in the tilt guide holes 14b. At this time, the fall restriction portion 120 of the outer column 21 abuts the connection piece 100 from above via the rubber 110 before the lock bolt 53 abuts against the inner peripheral edges of the lower ends of the tilt guide holes 14b. Accordingly, the column unit 11 is restricted from moving downward. Accordingly, it is possible to adjust the angle of the steering wheel 2 to any position. After the angle of the steering wheel 2 is adjusted, the steering device 1 is caused to enter the locked state.

As described above, the steering device 1 of the present embodiment is configured to include the connection piece 100 that is bridged between the front bracket 13 and the rear bracket 14 in a state of being fixed to each of the front bracket 13 and the rear bracket 14.

According to this configuration, the front bracket 13 can be restricted by the connection piece 100 from rotating with respect to the rear bracket 14 around the axis O2 in a state before the steering device 1 is installed in a vehicle. Therefore, the relative angle of the front bracket 13 with respect to the rear bracket 14 can be maintained at a desired position. Accordingly, it is possible to restrict the front bracket 13 from rotating with respect to the rear bracket 14 due to an impact or the like acting on the steering device 1 in a case where the steering device 1 is transported or the like from a bucket for transportation to a production line when being mounted onto a vehicle. As a result, it is possible to mount the steering device 1 on the vehicle without spending time and effort on checking the relative angle of the front bracket 13 with respect to the rear bracket 14 or correcting the relative angle on the production line. Therefore, it is possible to achieve an improvement in assembling property.

In the case of the steering device 1 of the present embodiment, since the front bracket 13 and the rear bracket 14 are connected to each other only by the connection piece 100, size reduction and weight reduction can be achieved in comparison with a case where an integrated bracket is provided over a front end portion and a rear end portion of a column unit as in the related art. In the case of the steering device 1 of the present embodiment, it is possible to maintain the feeling of driving since it is possible to sufficiently secure the strength of the brackets 13 and 14 in comparison with a case where an existing bracket is thinned to reduce weight or the like.

In the case of the steering device 1 of the present embodiment, it is possible to suppress an increase in manufacturing cost caused by addition of the connection piece 100 since there is no significant design change of the existing brackets 13 and 14.

In the steering device 1 of the present embodiment, the column unit 11 includes the rise restriction portion 121 that abuts the connection piece 100 from below to restrict rise of the column unit 11 with respect to the rear bracket 14 before the lock bolt 53 abuts the inner peripheral edges of the upper edges of the tilt guide holes 14b at the time of the tilting operation.

According to this configuration, the rise of the column unit 11 is restricted with the rise restriction portion 121 coming into contact with the connection piece 100. Accordingly, while the column unit 11 (the steering wheel 2) is moving to an uppermost position, the column unit 11 can be held at all times in a state where an outer peripheral surface of the lock bolt 53 is caused to abut onto an inner peripheral surface of the through-holes 29 from below by an urging force of the urging members 60. That is, wobbling of the column unit 11 with respect to the lock bolt 53 can be suppressed. In the case of the steering device 1 of the present embodiment, the column unit 11 can be restrained from being lowered by an amount corresponding to wobbling between the through-holes 29 and the lock bolt 53 (corresponding to a gap between the outer peripheral surface of the lock bolt 53 and inner peripheral surfaces of the through-holes 29) after the steering device 1 enters the locked state at an uppermost position and the steering wheel 2 can be fixed at a desired uppermost position.

In the steering device 1 of the present embodiment, the column unit 11 includes the fall restriction portion 120 that abuts the connection piece 100 from above to restrict fall of the column unit 11 with respect to the rear bracket 14 before the lock bolt 53 abuts the inner peripheral edges of the lower edges of the tilt guide holes 14b at the time of the tilting operation.

According to this configuration, an urging force of the urging members 60 is increased when the urging members 60 are extended due to fall of the column unit 11. Therefore, fall of the column unit 11 is restricted by the fall restriction portion 120 before the urging force of the urging members 60 becomes larger than the own weight of the column unit 11 or the like. As a result, it is possible to restrain the column unit 11 from rising due to the urging force of the urging members 60 after the steering device 1 enters the locked state at a lowermost position. Accordingly, the steering wheel 2 can be fixed at a desired lowermost position.

In the steering device 1 of the present embodiment, the rubber 110 is provided at a position on the connection piece 100 that faces any of the rise restriction portion 121 and the fall restriction portion 120.

According to this configuration, the rise restriction portion 121 and the fall restriction portion 120 come into contact with the connection piece 100 via the rubber 110 and thus a noise or impact attributable to contact between the column unit 11 and the connection piece 100 at the uppermost position and the lowermost position can be reduced.

The steering device 1 of the present embodiment includes the protrusion portion 13c formed the front bracket 13, the positioning hole 102 into which the protrusion portion 13c is fitted, and the rivet 103 inserted into the fixation hole 101 formed in the connection piece 100 and configured to fasten the connection piece 100 and the front bracket 13 to each other, the positioning hole 102 being formed in the connection piece 100.

According to this configuration, the connection piece 100 is fixed to the front bracket 13 at two points and thus the connection piece 100 can be restricted from rotating with respect to the front bracket 13. Accordingly, in the case of the steering device 1 of the present embodiment, it is easy to maintain the relative angle of the front bracket 13 with respect to the rear bracket 14 at a desired position. In the case of the steering device 1 of the present embodiment, it is easy to fasten the connection piece 100 and the front bracket 13 to each other through the fixation hole 101 when fitting the protrusion portion 13c into the positioning hole 102 in advance. As a result, it is possible to suppress a decrease in manufacturing efficiency caused by addition of the connection piece 100.

Although preferable examples of the present disclosure have been described above, the present disclosure is not limited to the examples. Configurations may be added, omitted, replaced, or modified without departing from the gist of the present disclosure. The present disclosure is not limited by the above description, but only by the appended claims.

For example, in the above-described embodiment, a configuration in which the axis O1 intersects the shaft axial direction has been described. However, the present disclosure is not limited to this thereto. The axis O1 may coincide with the shaft axial direction of the vehicle.

In the above-described embodiment, a configuration in which the hanger bracket 23 is downwardly provided at the inner column 22 has been described. However, the present disclosure is not limited thereto. For example, the hanger bracket 23 may be upwardly or laterally provided with respect to the inner column 22.

In the above-described embodiment, a configuration in which the steering device 1 can perform the telescopic operation and the tilting operation has been described. However, the present disclosure is not limited thereto. It is sufficient that the steering device 1 is configured to be capable of at least the tilting operation.

In the above-described embodiment, a configuration in which the connection piece 100 is disposed outside the column unit 11 in the right-left direction has been described. However, the present disclosure is not limited thereto. The connection piece 100 may be disposed above or below the column unit 11. A plurality of the connection pieces 100 may be provided as long as the front bracket 13 and the rear bracket 14 are partially connected to each other.

In the above-described embodiment, a configuration in which the connection piece 100 is formed in a crank-like shape to avoid interference between the connection piece 100 and the projecting portions 26 has been described. However, the present disclosure is not limited thereto. The connection piece 100 may have a linear shape, a curved shape, or the like as long as the connection piece 100 is bridged between the front bracket 13 and the rear bracket 14.

In the above-described embodiment, a configuration in which the range of movement at the time of the tilting operation is restricted by the connection piece 100 has been described. However, the present disclosure is not limited thereto. It is sufficient that the connection piece 100 restricts the front bracket 13 from rotating with respect to the rear bracket 14 at least.

In the above-described embodiment, a configuration in which the lock bolt 53 as a protruding portion in the present disclosure moves upward and downward in the tilt guide holes 14b has been described. However, the present disclosure is not limited thereto. A protruding portion may be provided separately from the lock bolt 53 from the column unit 11 (for example, the outer column 21).

In the above-described embodiment, a configuration in which the connection piece 100 abuts the fall restriction portion 120 and the rise restriction portion 121 formed on the outer column 21 has been described. However, the present disclosure is not limited thereto. A groove or the like may be formed on the connection piece 100 and a protruding portion formed on the outer column 21 may move inside the groove to limit the range of vertical movement.

While preferred embodiments of the invention have been described and illustrated above, it should be understood that these are exemplary examples of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXPLANATION OF REFERENCES

1: steering device
11: column unit
12: steering shaft
13: front bracket
13c: protrusion portion
14: rear bracket
14b: tilt guide hole
29: through-hole
53: lock bolt (protruding portion)
60: urging member
100: connection piece
101: fixation hole
102: positioning hole (recess portion)
103: rivet (fastening member)
110: rubber (elastic member)
120: fall restriction portion
121: rise restriction portion
O1: axis (first axis)
O2: axis (second axis)

What is claimed is:

1. A steering device comprising:
a column unit configured to support a steering shaft such that the steering shaft is rotatable around a first axis extending along a front-rear direction;
a front bracket attached to a vehicle body in a state of supporting the column unit such that the column unit is rotatable around a second axis extending along a right-left direction;
a protruding portion configured to protrude in the right-left direction from the column unit;
a rear bracket that includes a tilt guide hole and is attached to the vehicle body behind the front bracket, the tilt guide hole guiding the protruding portion to move upward and downward as the column unit rotates around the second axis; and
a connection piece bridged between the front bracket and the rear bracket in a state of being fixed to each of the front bracket and the rear bracket.

2. The steering device according to claim 1, further comprising:
an urging member connected to the protruding portion and configured to urge the column unit upward via the protruding portion,
wherein the column unit includes a rise restriction portion that abuts the connection piece from below to restrict rise of the column unit with respect to the rear bracket before the protruding portion abuts an inner peripheral edge of an upper end of the tilt guide hole when the column unit rotates around the second axis.

3. The steering device according to claim 2,
wherein an elastic member is provided at a position on the connection piece that faces any of the rise restriction portion and the fall restriction portion in a direction of rotation of the column unit around the second axis.

4. The steering device according to claim 3, further comprising:
a protrusion portion formed in one of the connection piece and the front bracket;
a recess portion into which the protrusion portion is fitted, the recess portion being formed in the other of the connection piece and the front bracket; and
a fastening member inserted into a fixation hole penetrating the connection piece and configured to fasten the connection piece and the front bracket to each other.

5. The steering device according to claim 2,
wherein the protruding portion penetrates a through-hole formed in the column unit in the right-left direction,
the steering device further comprises an urging member connected to the protruding portion and configured to urge the column unit upward via the protruding portion, and
the column unit includes a fall restriction portion that abuts the connection piece from above to restrict fall of the column unit with respect to the rear bracket before the protruding portion abuts an inner peripheral edge of a lower end of the tilt guide hole when the column unit rotates around the second axis.

6. The steering device according to claim 2, further comprising:
a protrusion portion formed in one of the connection piece and the front bracket;
a recess portion into which the protrusion portion is fitted, the recess portion being formed in the other of the connection piece and the front bracket; and
a fastening member inserted into a fixation hole penetrating the connection piece and configured to fasten the connection piece and the front bracket to each other.

7. The steering device according to claim 1,
wherein the protruding portion penetrates a through-hole formed in the column unit in the right-left direction,
the steering device further comprises an urging member connected to the protruding portion and configured to urge the column unit upward via the protruding portion, and
the column unit includes a fall restriction portion that abuts the connection piece from above to restrict fall of the column unit with respect to the rear bracket before the protruding portion abuts an inner peripheral edge of a lower end of the tilt guide hole when the column unit rotates around the second axis.

8. The steering device according to claim 7,
wherein an elastic member is provided at a position on the connection piece that faces any of the rise restriction portion and the fall restriction portion in a direction of rotation of the column unit around the second axis.

9. The steering device according to claim 7, further comprising:
a protrusion portion formed in one of the connection piece and the front bracket;
a recess portion into which the protrusion portion is fitted, the recess portion being formed in the other of the connection piece and the front bracket; and
a fastening member inserted into a fixation hole penetrating the connection piece and configured to fasten the connection piece and the front bracket to each other.

10. The steering device according to claim 1, further comprising:
a protrusion portion formed in one of the connection piece and the front bracket;
a recess portion into which the protrusion portion is fitted, the recess portion being formed in the other of the connection piece and the front bracket; and a fastening member inserted into a fixation hole penetrating the connection piece and configured to fasten the connection piece and the front bracket to each other.

\* \* \* \* \*